US011635316B2

(12) United States Patent
Fuchs et al.

(10) Patent No.: US 11,635,316 B2
(45) Date of Patent: Apr. 25, 2023

(54) ULTRASONIC FLUID MEASURING ARRANGEMENT WITH AT LEAST TWO WAVEGUIDE PARTS SPACED APART ON AN OUTER WALL OF A MEASURING TUBE

(71) Applicants: Buerkert Werke GmbH & Co. KG, Ingelfingen (DE); Burkert S.A.S., Triembach-au-Val (FR)

(72) Inventors: Yannick Fuchs, Triembach-au-Val (FR); Yves Hoog, Triembach-au-Val (FR); Bertrand Koenig, Triembach-au-Val (FR)

(73) Assignees: Buerkert Werke GmbH & Co. KG, Ingelfingen (DE); Burkert S.A.S., Triembach-au-Val (FR)

( * ) Notice: Subject to any disclaimer, the term of this patent is extended or adjusted under 35 U.S.C. 154(b) by 303 days.

(21) Appl. No.: 17/065,196

(22) Filed: Oct. 7, 2020

(65) Prior Publication Data

US 2021/0102825 A1 Apr. 8, 2021

(30) Foreign Application Priority Data

Oct. 8, 2019 (FR) ...................................... 19/11120

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| 4,336,719 A * | 6/1982 | Lynnworth | ............. G01F 1/002 73/861.31 |
| 2011/0239769 A1 | 10/2011 | Schmitt et al. | |
| 2012/0060591 A1 | 3/2012 | Faustmann et al. | |
| 2014/0360270 A1 * | 12/2014 | Koenig | ................ G01N 29/024 73/597 |
| 2019/0331642 A1 * | 10/2019 | Fuchs | ..................... G01F 15/18 |

FOREIGN PATENT DOCUMENTS

| EP | 2343548 A2 | 7/2011 | |
| WO | WO-2011039311 A3 * | 9/2011 | ............. G01F 1/662 |

* cited by examiner

*Primary Examiner* — Harshad R Patel
(74) *Attorney, Agent, or Firm* — Dilworth IP, LLC

(57) ABSTRACT

A fluid measuring arrangement with a flow channel for a fluid to be measured having at least two areas of an outer wall forming waveguide parts for surface acoustic waves. The waveguide parts are spaced apart from each other along the circumference of the flow channel. A first and/or a second signal converter is arranged at each waveguide part, wherein at least two first signal converters arranged on different waveguide parts or two second signal converters arranged on different waveguide parts are spaced with respect to each other in the axial direction of the flow channel.

18 Claims, 5 Drawing Sheets

ULTRASONIC FLUID MEASURING ARRANGEMENT WITH AT LEAST TWO WAVEGUIDE PARTS SPACED APART ON AN OUTER WALL OF A MEASURING TUBE

FIELD OF THE INVENTION

The invention relates to a fluid measuring means.

BACKGROUND

In many systems, it is necessary to determine a flow rate of a fluid. For this purpose, a fluid measuring means is inserted into one of the fluid lines of the system, i.e. a device by means of which a flow of a fluid flowing through a measuring tube can be measured.

The fluid measuring means used should be configured as compact and robust as possible, i.e. it should require little installation space and be largely maintenance-free. It is also advantageous if the fluid measuring means can be used as universally as possible. In particular, it should be usable for different fluids or to determine different properties.

Of course, the highest possible measuring accuracy is also desired in the case of an uneven flow in the measuring tube, as can occur, for example, if the fluid flow does not completely fill the cross-section of the measuring tube.

One measuring method that is suitable for such a task is the use of surface acoustic waves, which are excited in an acoustic waveguide and partially decoupled into the fluid and from there partially coupled again into a waveguide, where they continue to travel as surface acoustic waves. The type and frequency of the surface waves is chosen such that a partial decoupling as longitudinal sound waves into the fluid takes place. The waves that are decoupled into the fluid pass through the fluid and are usually reflected once or several times on an inner side of the measuring tube on their measurement path before they are again coupled into the waveguide. The fluid is in direct contact with the waveguide for this measuring method. In this way, a characteristic signal is obtained at an acoustic receiver, which is arranged on a waveguide at a distance from the transmitter, the temporal intensity curve of this signal, including the time delay compared to the signal emitted by the transmitter, allowing conclusions to be drawn about characteristic properties of the fluid, such as the sound velocity, temperature, homogeneity, flow velocity, flow rate, flow volume, density, composition of a multi-phase flow, concentration or viscosity.

This measuring method is particularly suitable for liquid, but also for highly viscous, dough-like, gel-like or pasty fluids of homogeneous or inhomogeneous nature, including biological samples. The use for gaseous fluids would also be conceivable, wherein in this case, the sound velocities would have to be taken into account, which differ considerably from those of liquids. If the fluid flows through the measuring means, changes in the fluid over time can also be detected.

The spatial propagation of the bulk sound waves in the fluid is achieved, for example, by decoupling the bulk sound waves into the fluid at an angle δ relative to a surface normal of the waveguide. For a stagnant fluid, the relationship can be described by the following formula:

$$\delta = \arcsin\left(\frac{c_M}{c_S}\right),$$

where $c_M$ is the sound velocity of the bulk sound waves within the fluid and $c_S$ is the sound velocity of the surface acoustic waves propagating along the waveguide.

In the most common case, in which the sound velocity in the fluid is less than that of the surface acoustic waves in the waveguide, sound waves are decoupled at an angle other than zero, and the bulk sound waves travel a spatial distance along the waveguide, possibly with multiple reflections within the fluid. Since the angle of the decoupling depends on the sound velocity of the fluid, the course of the bulk waves through the fluid also depends on the fluid to be measured.

In the known devices, the transmitter and receiver are mounted on a side of the respective waveguide opposite the interface with the fluid. In order to be able to couple surface sound waves excited on this side of the waveguide into the fluid, Lamb waves are therefore preferably excited, i.e. waves the wavelength of which is considerably longer than the thickness of the waveguide between the transmitter and the fluid. In this case, both the top side and the bottom side of the waveguide move, the oscillation also including a longitudinal component. Therefore, this type of excitation is suitable for decoupling bulk sound waves. It is also possible to select the wavelength of the excited surface acoustic waves in the order of the thickness of the waveguide, wherein surface waves are then excited in a transition area between Lamb waves and Rayleigh waves. It would also be conceivable to use Rayleigh waves or Leaky-Rayleigh waves.

The devices described so far in the prior art, which work according to the principle described above, are complex in design and costly in production and maintenance.

The object of the invention is to create a compact and robust, yet flexibly applicable fluid measuring means based on the principle of surface acoustic waves with a high measuring accuracy, which also achieves good measuring results when measuring different fluids.

SUMMARY

The present invention provides a fluid measuring means comprising a measuring tube in which a circumferentially closed flow channel for a fluid to be measured is formed and in which at least two areas of an outer wall of the measuring tube are formed as waveguide parts, which each form a waveguide for surface acoustic waves. A first and/or a second signal converter is arranged at each waveguide part, wherein the or each signal converter is designed to excite surface acoustic waves in the respective waveguide part and/or to receive surface acoustic waves from the waveguide part. Surface acoustic waves emitted by the signal converter are adapted to be decoupled from the waveguide part and to propagate as bulk acoustic waves through the fluid in the flow channel, and/or bulk acoustic waves are adapted to be coupled into the waveguide and received by the signal converter. The waveguide parts are arranged offset and spaced apart from each other along the circumference of the flow channel. At least two first signal converters arranged on different waveguide parts or two second signal converters arranged on different waveguide parts are offset with respect to each other in the axial direction of the flow channel.

In particular, the wall thickness of the waveguide parts is selected such that a decoupling of impinging bulk sound waves into the respective waveguide part takes place and the resulting surface wave propagates along the waveguide part to one of the signal converters. It has proven to be advantageous to reduce the wall thickness of the measuring tube in the waveguide parts compared to the wall thickness of the measuring tube outside the waveguide parts. The wall thickness of the measuring tube outside the waveguide parts is preferably chosen so large that there is essentially a reflection of the bulk sound wave, but only a negligible decoupling of surface waves.

Depending on the sound velocity of the fluid to be measured, different measurement path through the flow channel are formed between the individual signal converters, since the decoupling angles and thus both the coupling points into the waveguide part and any reflection points on the inner side of the flow channel on the waveguide parts or in the circumferential direction next to the waveguide parts shift.

It should be noted here that in the context of this application, only bulk waves are considered which are decoupled into the fluid in the immediate area of the respective signal converter working as a transmitter. Although it is conceivable that the bulk waves propagate in the axial direction beyond the waveguide parts, so that reflection points as well as coupling points occur outside the waveguide parts and outside the axial area between the signal converters, such reflection points and coupling points are not considered in the context of this application, as they do not contribute to the measurement and are thus negligible.

The different measurement paths (in the following also referred to as measurement sections), which usually also have different lengths, are taken into account by the fact that the arrangement of the signal converters is optimized for at least two different fluid sound velocities. For example, the signal intensity at the signal converter working as a receiver depends on where the bulk wave couples into the waveguide part where this signal converter is placed. Particularly high signal intensities can be achieved if the coupling point along the propagation direction is located immediately in front of or directly in the area of this signal converter. It is therefore advantageous to take the sound velocities of the fluids to be measured into account when selecting the distance between the signal converters working as transmitters and receivers.

Since the position of the signal converters cannot be changed in the finished fluid measuring means, it is necessary to optimize the measurement paths and the position of the signal converters in a purposeful manner for selected sound velocities and fluids.

It has been found that a good measuring result for different fluids can be achieved if the fluid measuring means is designed such that a measurement section extending through the flow channel between two signal converters (of which one works as a transmitter and one as a receiver, this being assumed and not always mentioned individually in the following) having a greater length is provided for fluids with higher sound velocities, and a measurement section extending through the flow channel between two signal converters having a smaller length for fluids with lower sound velocities. The higher sound velocity can in particular be selected higher than 1800 m/s, and the smaller sound velocity in particular less than 1300 m/s. The decoupling angles are, for example, approximately in the range between 20° and 40°. The terms "greater length" and "smaller length" are a relative reference to the respective other measurement section.

The fluid measuring means preferably comprises an evaluation unit which evaluates the intensity signals received by all signal converters of the fluid measuring means which can be usefully used as receivers during a measurement and thus ascertains the desired parameter to be determined. During the evaluation, it is possible to disregard individual signals, e.g. signals that are too low, or to combine several signals. It has been found that with a selection of two measurement sections for relatively high and relatively low fluid sound velocities, even fluids having intermediate sound velocities (as is the case for water and many aqueous solutions, for example) can be measured with a very high degree of accuracy.

Within the scope of this application it is basically provided that each signal converter can work both as a transmitter and as a receiver, even if this is not specifically mentioned. The respective function can be preset by a suitable control unit for the respective measuring procedure and can also change in the time sequence of a measuring procedure. If several measurements are carried out in which the function of the signal converters changes between transmitter and receiver, it is for example possible to realize a measurement section extending with the direction of flow of the fluid and a measurement section extending against the direction of flow of the fluid. The geometry of the measurement section does usually not change, so that the selected position of the signal converters in the axial direction is suitable for both measuring directions.

In addition, depending on the diameter of the flow channel for fluids having the described sound velocities, a course of the measurement section having more or less reflection points is achieved. With common dimensions of the measuring tube, for example a diameter between 60 and 120 mm and a length between 60 and 130 mm, it is no longer possible to define a practicable measurement section that includes a reflection point above a specific measuring tube diameter, as the reflected bulk wave would always hit the waveguide part from which the bulk wave originates only after the signal converter in the axial direction. Even with lower fluid sound velocities and smaller measuring tube diameters, measurement sections are preferred where at most one reflection of the bulk wave occurs.

It is generally possible to specify a principle course of the measurement section depending on the measuring tube diameter.

In a first possible variant, all waveguide parts are each located opposite an area of the measuring tube which is not configured as a waveguide part and on which no signal converters are provided. These areas of the outer wall of the measuring tube have a wall thickness which is unchanged compared to the areas of the outer wall adjacent in the circumferential direction. The fluid measuring means is designed such that the decoupled bulk sound wave is reflected back at this area of the inner wall to the waveguide part from which it was decoupled. In particular, the bulk wave is reflected only once.

In this variant, therefore, two waveguide parts are not diametrically opposed on the measuring tube; rather, the waveguide parts are offset along the circumference by an angle that deviates from 180°, wherein the angle is e.g. 45°, 60°, 90° or 120°. Therefore, the bulk wave decoupled from a waveguide part does not hit a waveguide part, but is reflected back at the measuring tube wall towards the waveguide part in which the bulk wave was excited, without significant decoupling into the measuring tube wall. There, the bulk wave is partially again coupled into the waveguide part and runs therein up to the signal converter serving as a receiver.

For such a fluid measuring means, a minimum of two waveguide parts and a total of four signal converters are required, wherein two signal converters are arranged on each waveguide part.

This variant is favorable for smaller tube diameters, for example for measuring tube diameters between 4 mm and 50 mm, in particular between 15 mm and 40 mm. A circular cross-section of the measuring tube is assumed.

The measurement sections for fluids with higher and lower sound velocity differ here mainly in the distance that the first and the second signal converter have on a waveguide part. Therefore, these distances should be different for at least two waveguide parts, wherein on the waveguide part assigned to the measurement section optimized for higher sound velocities, the two signal converters are arranged further apart than on the other waveguide part.

It is of course possible to provide more than two waveguide parts, wherein the arrangement of the signal converters can be identical for several waveguide parts or also different for all waveguides, to increase either the number of the measurement paths for individual sound velocities or the number of the measurement paths optimized for a specific sound velocity.

The direct section between the two signal converters on a waveguide part serves as a reference section on which the course of the not decoupled surface waves is detected.

In a further variant, the fluid measuring means has an even number of waveguide parts, wherein two waveguide parts are each arranged diametrically opposite each other and form a pair of waveguides. Each pair of waveguides comprises a waveguide part serving as reference waveguide and a waveguide part serving as measuring waveguide. The axial position of the first and/or the second signal converter on the measuring waveguide differs in at least two pairs of waveguides.

Here, a total of at least four waveguide parts are required to provide two measurement sections optimized for different sound velocities, wherein at least at total of three signal converters must be provided per pair of waveguides. Two of them are respectively arranged on a reference waveguide. It is possible to provide only one single signal converter on the measuring waveguides.

When using a total of four waveguide parts, these are preferably each arranged at a distance of 90° along the circumference.

The distance between the first and the second signal converter is preferably the same on each of the reference waveguides.

This design is suitable for measuring tubes having a larger diameter, wherein the measuring tube diameter is in particular between 10 mm and 400 mm and more particularly between 40 mm and 200 mm. A circular cross-section of the measuring tube is also assumed here.

With these geometric conditions, there is usually no reflection point in the measurement section. The decoupled bulk waves cross the flow channel only once and are coupled into the opposite waveguide part, where they meet a signal converter, which is currently working as a receiver.

In different pairs of waveguides, the first or the second signal converters are in particular in different axial positions.

It is thus possible to form one respective measurement section between the first signal converter of the reference waveguide and the signal converter on the associated measuring waveguide of the pair of waveguides, wherein in particular the decoupled bulk acoustic waves are not reflected at an inner side of the flow channel before they couple into the measuring waveguide.

Here, the length of the measurement section can be specified by the position of the signal converter on the measuring waveguide and optimized for different sound velocities.

Preferably, a length of a measurement section extending through the flow channel between a first and a second signal converter of diametrically opposed waveguide parts is different for two pairs of waveguides, so that at least two measurement sections optimized for different sound velocities are provided.

Of course, further pairs of waveguides may be provided, wherein either several measurement sections of the same length can be realized, or measurement sections of different lengths, which are optimized for further sound velocities may be provided.

It is possible to use one of the signal converters on the reference waveguide or a signal converter on the measuring waveguide as a transmitter, so that a measurement in and against the flow direction is also possible in this variant.

The distance between the first and the second signal converter may respectively be identical on one waveguide part of two different pairs of waveguides, preferably respectively on the reference waveguide. Since only the surface wave running along the measuring tube wall is detected on the reference waveguide, which is not dependent on the sound velocity of the respective fluid to be measured, it is not necessary to vary this distance.

In this variant, it is possible to use prefabricated sensor assemblies, each of which comprises two signal converters and a printed circuit board with the necessary electrical lines, on which the two signal converters are firmly mounted at the specified distance.

Two sensor assemblies are then installed at different axial positions in each pair of waveguides. Thus, two signal converters are provided on each of the measuring waveguides. It may be advantageous to switch the signal converter which is not located in the axial direction between the two signal converters on the reference waveguide such that it has no function.

Thus, one waveguide part or a pair of waveguides can respectively define a shorter measurement section extending through the flow channel, and one waveguide part or a pair of waveguides can respectively define a longer measurement section extending through the flow channel, so that the fluid measuring means has different measurement sections, each designed for different fluid sound velocities.

It is conceivable to arrange all signal converters at different axial positions.

The measuring tube wall is usually formed in one piece in the area of the flow channel. However, it could also be composed of several parts.

The flow channel preferably has a circular cross-section. However, in addition to a circular cross-sectional shape, the flow channel may also have any other suitable cross-sectional shape, which can be square, rectangular, hexagonal, octagonal or generally polygonal. However, attention must be paid to the course of the measurement sections through the flow channel.

Materials having a high sound velocity of preferably >1800 m/s are advantageous as material for the measuring tube. For example, metals such as stainless steel, brass and copper, but also high-strength plastics have this property.

If necessary, a velocity profile can be created over the cross-section of the flow channel using the fluid measuring means according to the invention.

It has proven to be advantageous if all waveguide parts are arranged such that they are each on a parallel to the central axis of the flow channel. Thus, the waveguide parts are parallel to the flow direction. This facilitates the evaluation.

Preferably, the signal converters are arranged such that bulk acoustic waves pass through the central axis of the flow channel directly after being decoupled from the respective waveguide part by each signal converter acting as a transmitter. This has the advantage that all measurement paths extend through the central axis and are thus geometrically defined in a simple way. This also facilitates the evaluation, particularly if the flow channel is not completely filled with the fluid to be measured.

The waveguide parts may form a part of the inner side of the flow channel that comes into direct contact with the fluid flowing through, wherein the waveguide parts are formed as flattenings on a rounded outer wall of the measuring tube in which the wall thickness of the measuring tube is reduced. The first and the second signal converter are each placed directly on the flattening of a waveguide part.

However, the inner side of the flow channel is not pierced because the waveguides each form part of the wall of the flow channel. The flattening reduces the wall thickness to a non-zero value. At least in the area of the flow channel, the measuring tube may be designed as a tube having an uninterrupted, one-piece wall, wherein the waveguide parts are formed by flattenings of the outer wall of the measuring tube, in which the wall thickness of the measuring tube is reduced compared to areas adjacent in the circumferential direction.

In a side view, the flattenings can each be formed at the axial ends thereof in an oblique manner and so as to taper to the axial end. Such a shape causes a continuous increase of the reduced wall thickness to the full, i.e. undiminished wall thickness of the measuring tube, seen in axial direction, and has a beneficial effect on the propagation of surface waves and the decoupling of the bulk waves along the waveguide part.

The flattening can be produced by milling, for example, which makes it easy to introduce areas having a reduced wall thickness into the measuring tube.

If the signal converters are part of a sensor assembly as described above, a sensor assembly can be attached to each waveguide part so that the two signal converters on the outer wall of the measuring tube are in direct contact with the waveguide part. Both the first and the second signal converter on a waveguide part should be arranged on the flattening.

Surface acoustic waves generated by a signal converter acting as a transmitter are then coupled directly into the waveguide part, from where they partially continue to travel along the waveguide as surface acoustic waves and are partially decoupled into the flow channel as bulk waves. A signal converter, which works as a receiver, receives surface acoustic waves directly from the waveguide part.

The shape of the cross-section of the flow channel, in particular the curvature of an inner side of the flow channel, should be identical for a circular cross-section of the flow channel in the area of the waveguide parts and outside the waveguide parts.

DETAILED DESCRIPTION

Figure 1:
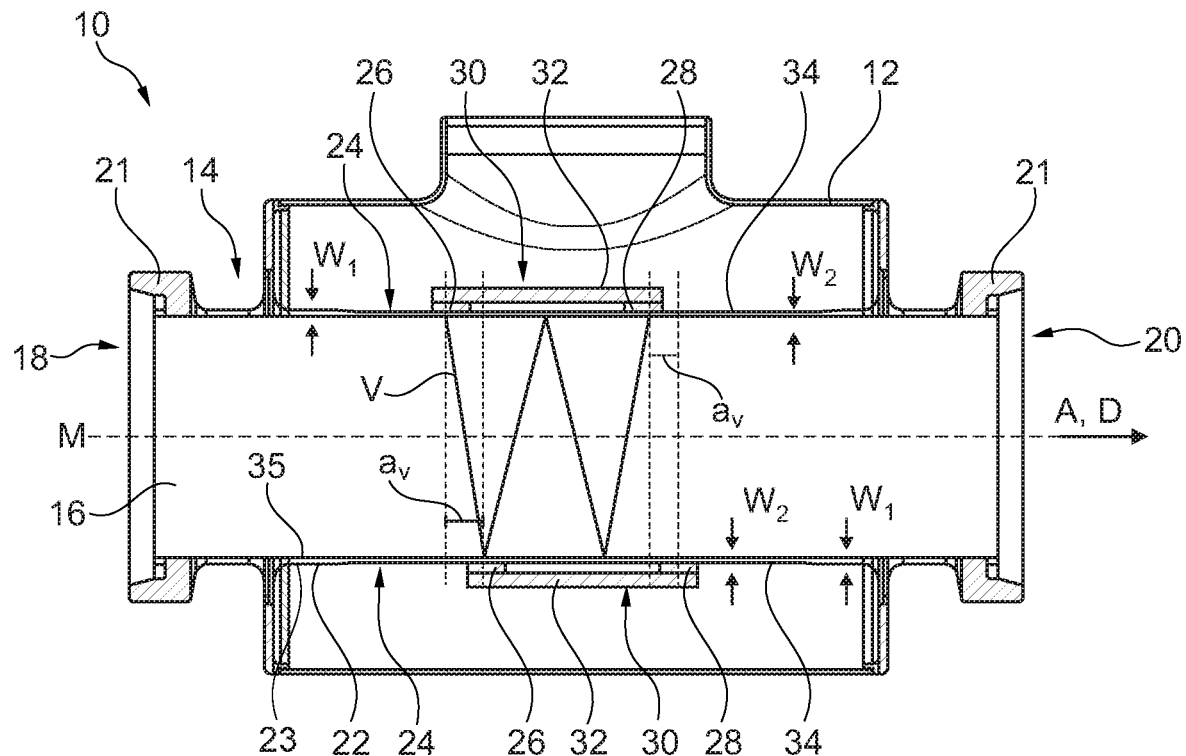
FIG. 1 shows a schematic sectional view of a fluid measuring means according to the invention with a measuring tube and a housing surrounding the measuring tube.

FIG. 1 shows a fluid measuring means 10, which is designed to measure different fluids flowing therethrough (not shown) to determine a flow velocity and/or other properties of the respective fluid.

An elongated measuring tube 14 which forms a flow channel 16 for the respective fluid to be measured is arranged in a housing 12. The flow channel 16 is a pipe circumferentially closed along its entire axial extension along a flow direction D, which merges at one end into a fluid inlet 18 and at the other end into a fluid outlet 20. In the area of the fluid inlet 18 and the fluid outlet 20, a respective flange 21 is formed on the measuring tube 14, which serves to install the fluid measuring means 10 in a fluid-carrying system. Usually, the fluid inlet 18 and the fluid outlet 20 are interchangeable in their function.

In the present case, the flow channel 16 forms a section extending in a straight line along the flow direction D, through which the fluid to be measured flows, wherein in this example, the cross-sectional area of the flow channel 16 is constant over its length.

The flow direction D coincides here with the axial direction A of the measuring tube 14.

Outside the measuring tube 14, the housing 12 is designed so that it does not carry fluid. For example electrical and electronic connections as well as, for example, a control unit for operating the fluid measuring means 10 are arranged here. If necessary, a display is also provided.

Figure 9:
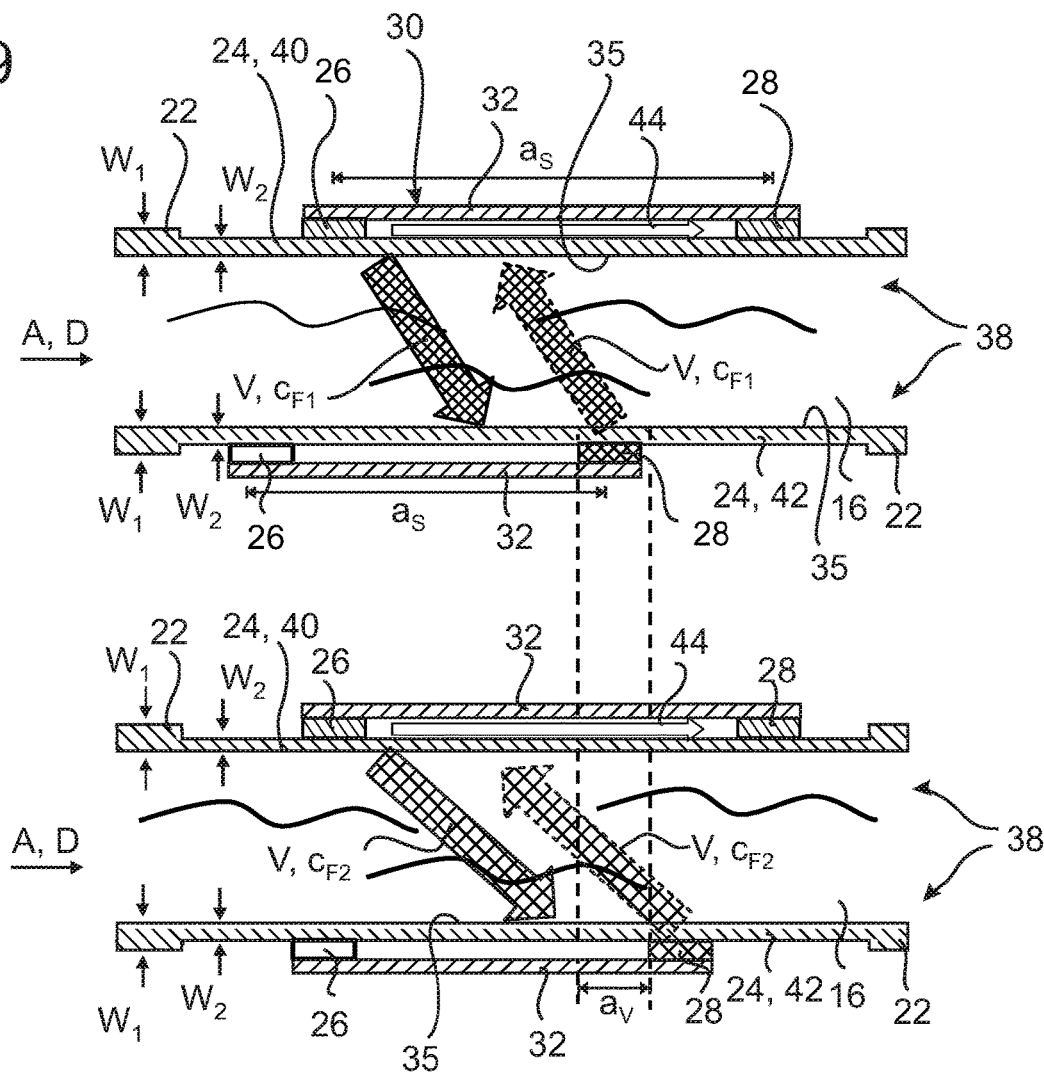
Figure 11:
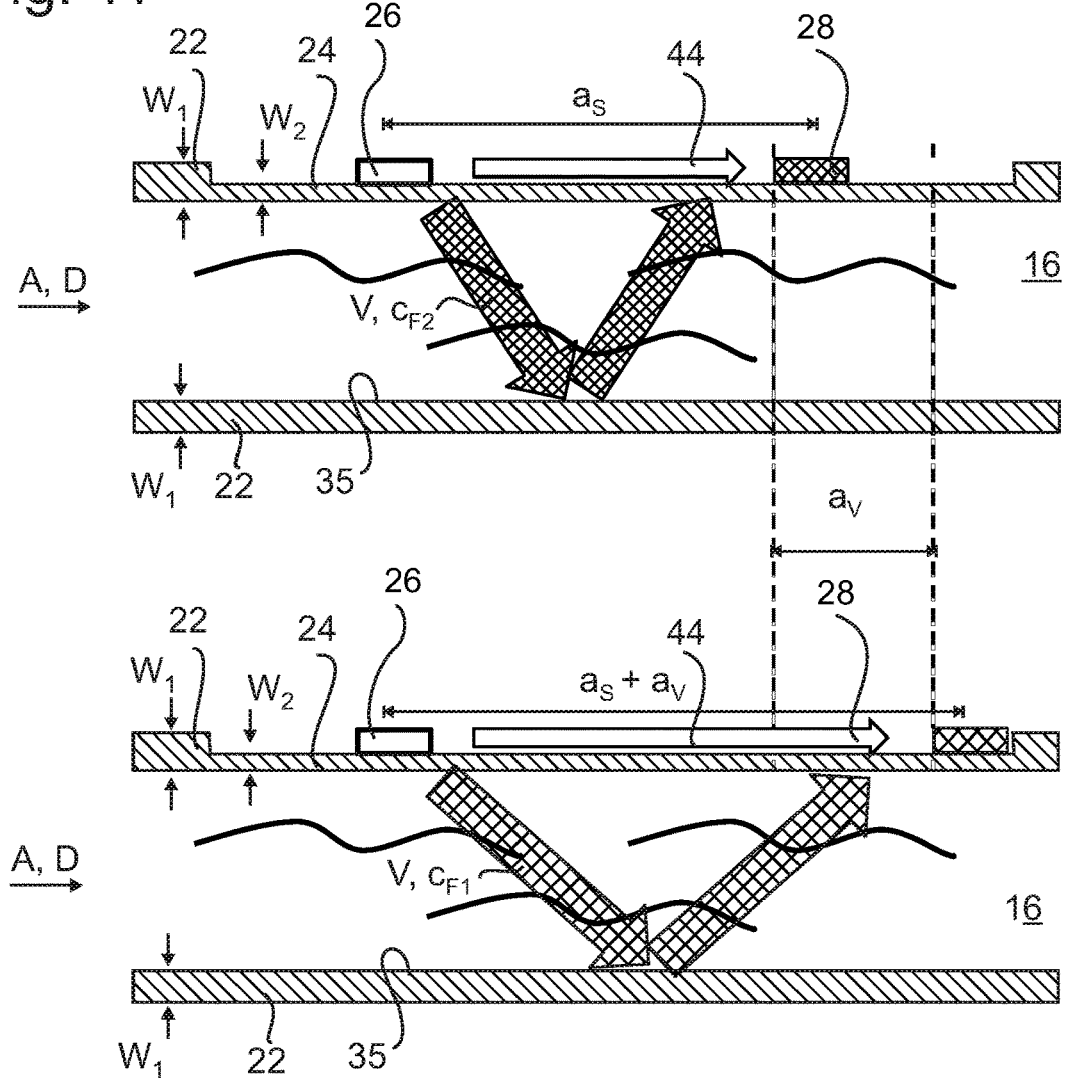

On an outer side 23 of an outer wall 22 of the measuring tube 14, several waveguide parts 24 for surface acoustic waves are formed so as to be distributed over the circumference (see also FIGS. 9 and 11).

A first and/or a second signal converter 26, 28 is arranged on each of the waveguide parts 24 with direct contact to the outer wall 22 of the measuring tube 14.

Figure 2:
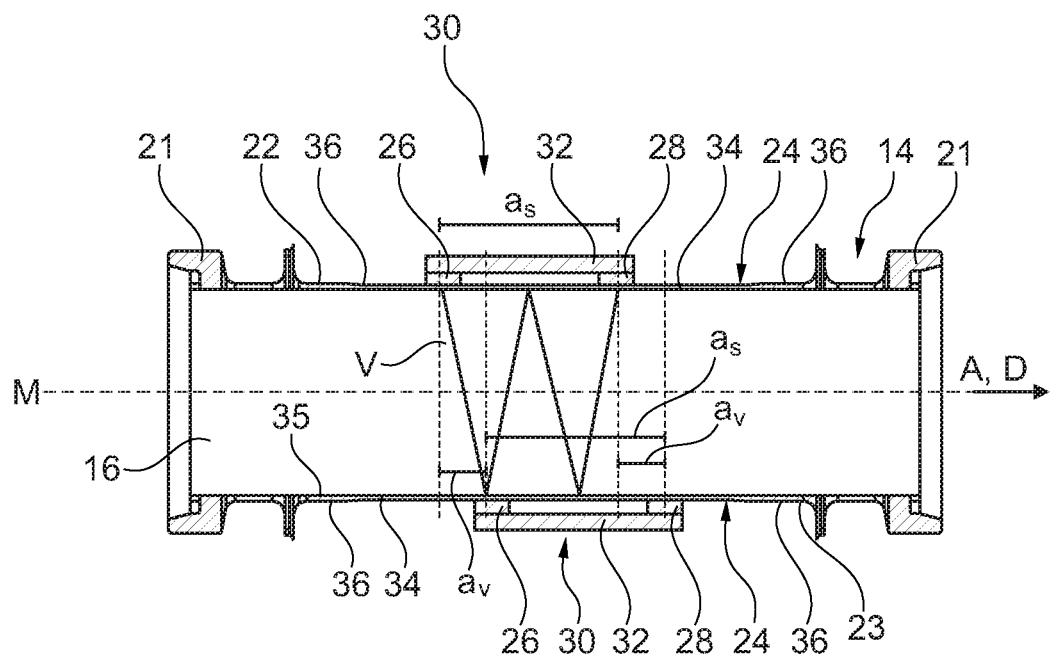
FIG. 2 shows the measuring tube of the fluid measuring means of FIG. 1.

FIGS. 1 and 2 illustrate the arrangement of the signal converters 26, 28 only schematically. In particular, possible axial positions of the signal converters 26, 28 are shown in FIGS. 9 and 11.

Figure 4:
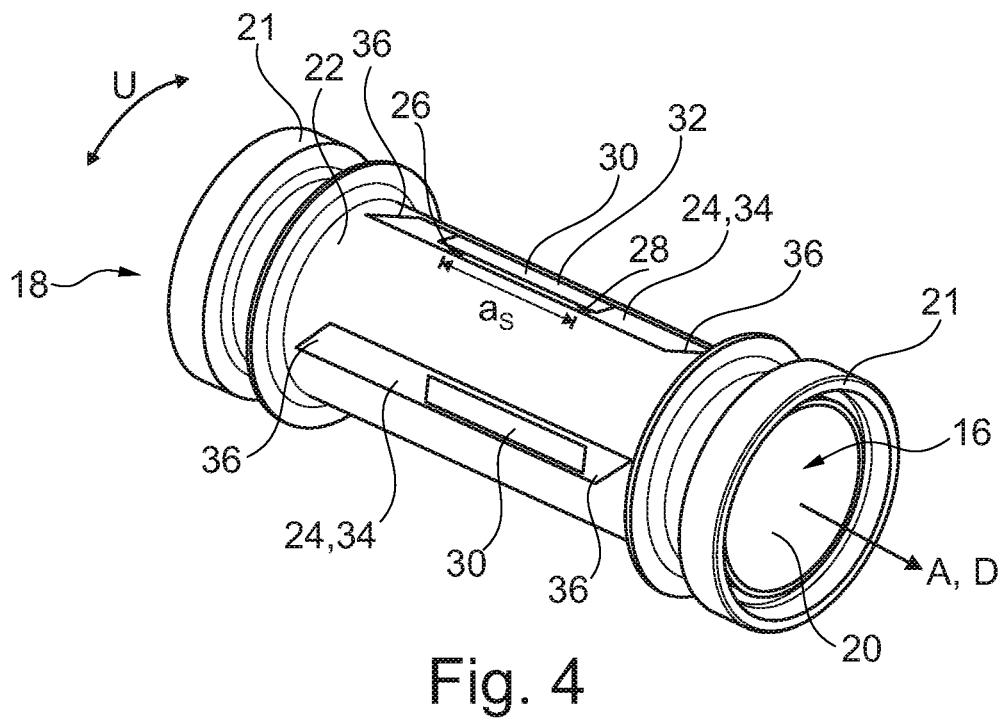
FIG. 4 shows a schematic perspective view of the measuring tube of FIG. 2, in which sensor assemblies are mounted on the individual waveguide parts.

In this example, the two signal converters 26, 28 on a waveguide part 24 can each be part of a sensor assembly 30, which, in addition to the two signal converters 26, 28, also comprises a printed circuit board 32 on which the two signal converters 26, 28 are mounted at a predetermined distance $a_S$ from each other (see FIGS. 2 and 4).

Optionally, the sensor assembly 30 may also have a temperature sensor (not shown).

Here, all signal converters 26, 28 are identically constructed and are piezo transducers in the form of an interdigital converter, which directly contacts the waveguide part 24. The signal converters 26, 28 can each be used as a transmitter or a receiver. In the transmitter mode, acoustic surface waves are excited in the waveguide part 24 by applying an alternating voltage to the signal converter 26, 28. In the receiver mode, the signal converter 26, 28 can receive surface waves from the waveguide part 24 and convert them into electrical signals.

All signal converters 26, 28 and all waveguide parts 24 are located at the flow channel 16. Only one flow channel 16 is provided in the fluid measuring means 10.

Figure 3:
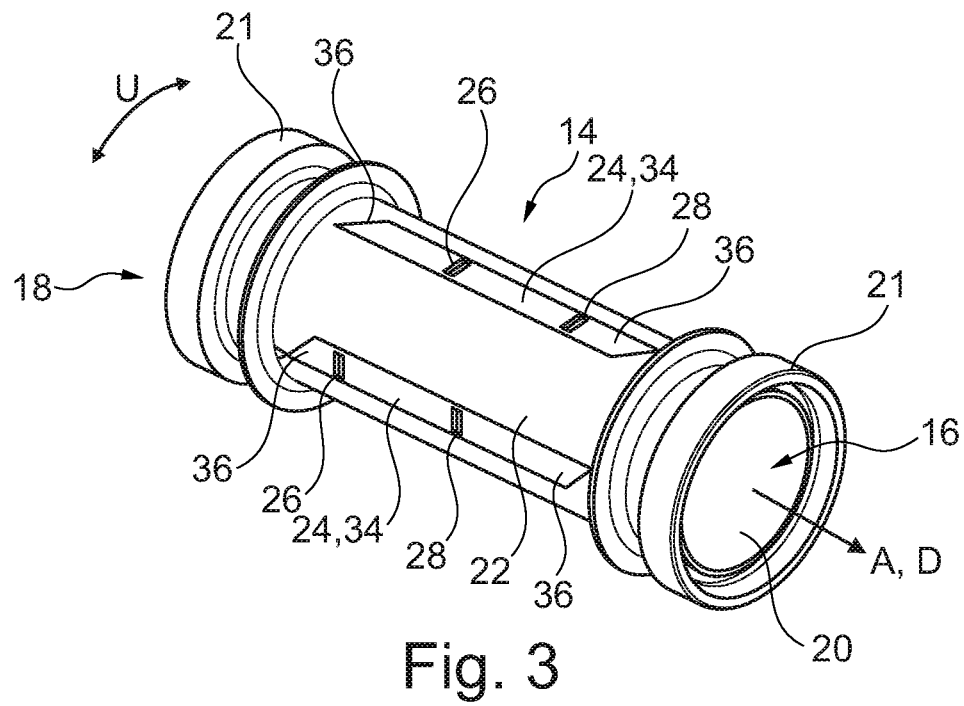
FIG. 3 shows a schematic perspective view of the measuring tube of FIG. 2, showing waveguide parts and signal converters arranged thereon.

In this example, the measuring tube 14 has a circular cross-section and, accordingly, an essentially round outer wall 22 (see, for example, FIGS. 3 and 4).

The waveguide parts 24 are formed as flattenings 34 extending in the axial direction A in the outer wall 22 of the measuring tube 14.

The width of the flattenings 34 in the circumferential direction U is here only insignificantly larger than the width of the signal converters 26, 28, which are completely arranged on the respective flattening 34.

Along the circumferential direction U, the measuring tube 14 has a first, thicker wall thickness $W_1$ in the area of the flow channel 16 outside the flattenings 34 of the waveguide parts 24, which is here also referred to as undiminished wall thickness. In the flattenings 34, i.e. the waveguide parts 24, the wall thickness $W_1$ is reduced to a smaller value $W_2$. However, the wall thickness always remains different from zero, so the outer wall 22 of the measuring tube 14 is not broken through at any point in the area of the flow channel 16.

In the flow channel 16, the fluid flowing therethrough comes into direct contact with the inner side 35 of the measuring tube 14, also at the parts of the inner side 35 where the flattenings 34 and thus the waveguide parts 24 are provided radially outside. The surface acoustic waves generated by the signal converters 26, 28 are therefore partially decoupled from the waveguide parts 24 into the fluid as bulk acoustic waves V upon contact with the fluid and, conversely, partially again coupled into the waveguide parts 24. This is shown schematically in FIGS. 1 and 2, the reflection points of the bulk acoustic waves being shown only schematically and the surface acoustic waves running in the waveguide parts 24 being not shown, either. It is also possible, more specifically depending on the angle of decoupling, the diameter and the length of the measuring tube 14, that the bulk wave within the flow channel 16 does not hit the inner side 35 at all after a reflection.

FIGS. 2 to 4 also clearly show the flattenings 34, which form the respective waveguide parts 24. In a side view, each of the flattenings 34 runs in the axial direction A at both axial ends 36 obliquely to the respective axial end 36, so that in the axial direction A, the flattening 34 passes continuously and without abrupt step from the reduced wall thickness $W_2$ to the undiminished wall thickness $W_1$ of the surrounding outer wall 22.

In the embodiment shown in FIGS. 6 to 9, the waveguide parts 24 are each arranged in pairs diametrically opposite each other on the outer wall 22 of the measuring tube 14, so that an imaginary straight line between opposite waveguide parts 24 runs through a central axis M of the flow channel 16. A total of four waveguide parts 24 are provided, wherein two respective opposite waveguide parts 24 are combined to form a pair of waveguides 38. In each pair of waveguides 38, one of the waveguide parts represents a reference waveguide 40 and the other waveguide part 24 represents a measuring waveguide 42 (see FIG. 9).

In this embodiment, the measuring tube 14 has a relatively large diameter $d_2$, which can be between 10 mm and 400 mm and more particularly between 40 mm and 200 mm, for example.

As shown in FIG. 9, this results in the bulk waves V, after being decoupled, crossing the flow channel 16 only once in the course of the measurement section and only the portions of the bulk waves V coupled into the opposite waveguide part 24 contribute to the measuring signal. Reflected portions of the bulk waves V only hit the measuring tube wall again (if at all) after the second signal converter 28, which receives the signal.

The two pairs of waveguides 38 are configured differently in that the position of the second signal converter 28 on the respective measuring waveguides 42 is selected differently.

In both pairs of waveguides 38, the second signal converters 28 on the measuring waveguides 42 are each located in the axial direction A between the first and the second signal converter 26, 28 on the reference waveguides 40, but in different axial positions.

The exact axial positions of the second signal converter 28 on the measuring waveguides 42 are respectively adapted to a firmly specified fluid sound velocity $c_{F1}$, $c_{F2}$.

In the examples shown here, the sound velocity $c_{F1}$ is exemplarily equal to or less than 1300 m/s and the sound velocity $c_{F2}$ is exemplarily equal to or greater than 1800 m/s.

A sensor assembly 30 is mounted on each waveguide part 24, so that two signal converters 26, 28 are arranged at the same distance $a_S$ on each of the four waveguide parts 24. This is done for production reasons. Of course, the signal converters 26, 28 could also be mounted separately. However, the first signal converters 26 on the measuring waveguides 42 are here without function and can also be switched so as to have no function by the evaluation unit.

On the two reference waveguides 40, the first and second signal converters 26, 28 are here each in the same axial position.

In the upper pair of waveguides 38 shown in FIG. 9, the second signal converter 28 is mounted on the measuring waveguide 42 in an axial position that is adapted for a maximum received signal intensity for the fluid sound velocity $c_{F1}$.

However, in the lower pair of waveguides 38 shown in FIG. 9, the second signal converter 28 is mounted on the measuring waveguide 42 in an axial position adapted for maximum received signal intensity for the fluid sound velocity $c_{F2}$.

Figure 8:
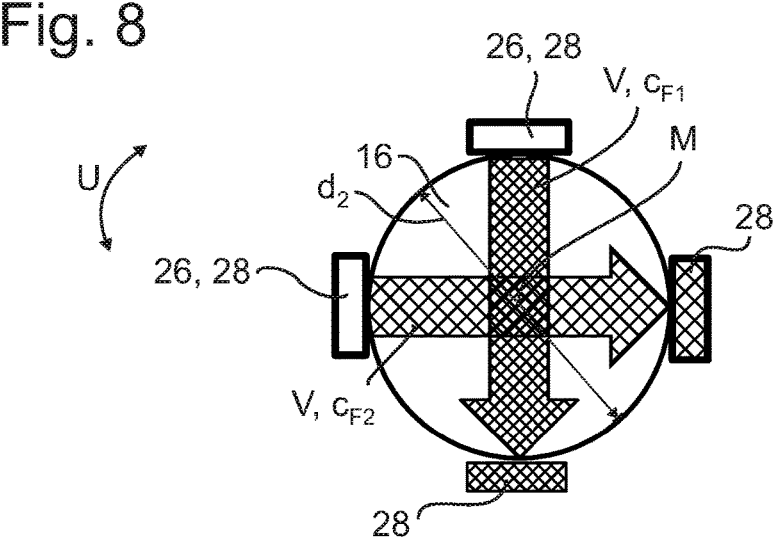
FIGS. 8 and 9 show a course of a measurement section through the flow channel for a first embodiment of the invention.

The two pairs of waveguides 38 are mounted with an offset of 90° with respect to each other in the circumferential direction U, as shown in FIG. 8.

To measure a fluid, a fluid flow is generated through the flow channel 16, which runs along the flow direction D either from the fluid inlet 18 to the fluid outlet 20 or vice versa.

During a measurement, for example, both first signal converters 26 of the reference waveguides 40 of the two pairs of waveguides 38 are excited and generate surface waves 44. On the one hand, these surface waves 44 run along the reference waveguide 40 to the respective second signal converter 28 on the respective reference waveguide 40 and are detected there. A part of the excited surface waves 44 is decoupled as bulk waves V into the fluid inside the flow channel 16 at an angle determined by the fluid sound velocity and passes through the fluid until hitting the opposite measuring waveguide 42 and is partially coupled in again there. There, the surface waves generated in this way travel to the second signal converter 28 on the measuring waveguide 42 and are detected there as an intensity signal with a time curve and transmitted to the evaluation unit.

From the data received in this way, the evaluation unit determines the desired parameter of the fluid. It is possible to ignore the measuring signals of individual signal converters 28 or to combine the measuring signals of several or all signal converters 28.

Due to the non-zero decoupling angle, the measurement section, which the bulk wave V travels through the flow channel 16 and which extends from the first signal converter 26 of the reference waveguide 40, which acts as a transmitter, through the flow channel 16 to the measuring waveguide 42 and from there to the second signal converter 28 on the measuring waveguide 42, has an axial component that runs either in or against the direction of flow of the fluid in the flow channel 16. If measurements are to be taken in the other direction, the respective second signal converter 28 on the measuring waveguide 42 can be used as a transmitter, while the first signal converter 26 on the reference waveguides 40 serves as a receiver. The measurement section is passed through in the opposite direction. The reference signal can be generated either by using the second signal converter 28 on the reference waveguides 40 as transmitter or by temporarily using the first signal converter 26 on the reference waveguides 40 as a transmitter.

Figure 7:
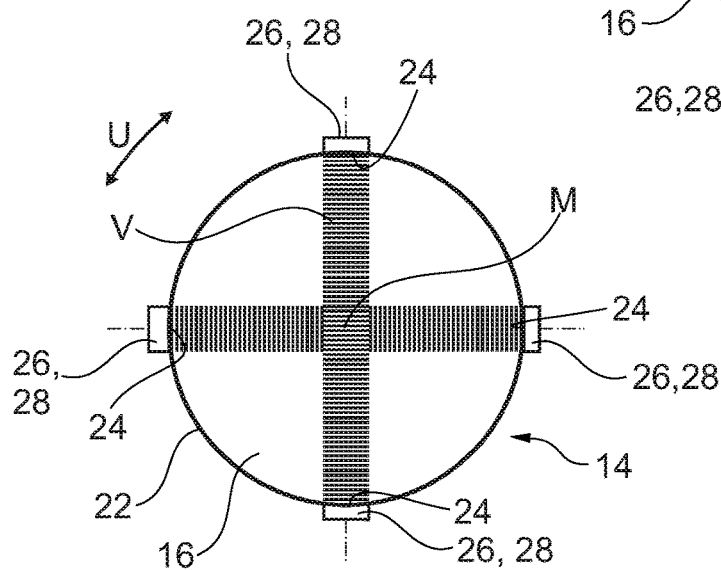
FIG. 7 shows a possible course of the bulk waves in the measuring tube of FIG. 6 in an axial plan view.

FIG. 7 shows that all measurement sections run through the center M of the flow channel 16.

Figure 5:
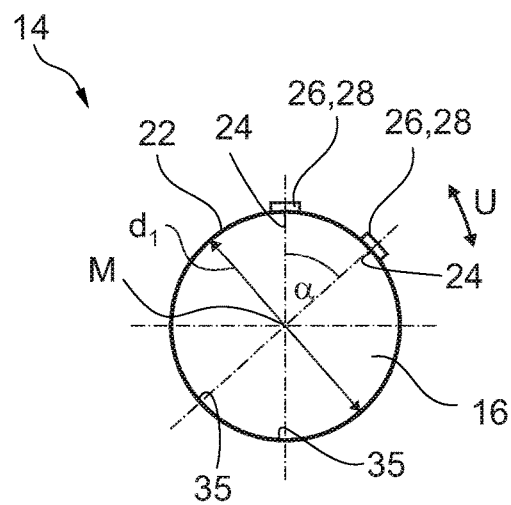
FIGS. 5 and 6 show possibilities for the arrangement of the waveguide parts on the measuring tube of a fluid measuring means according to the invention for different measuring tube diameters in an axial plan view.
Figure 6:
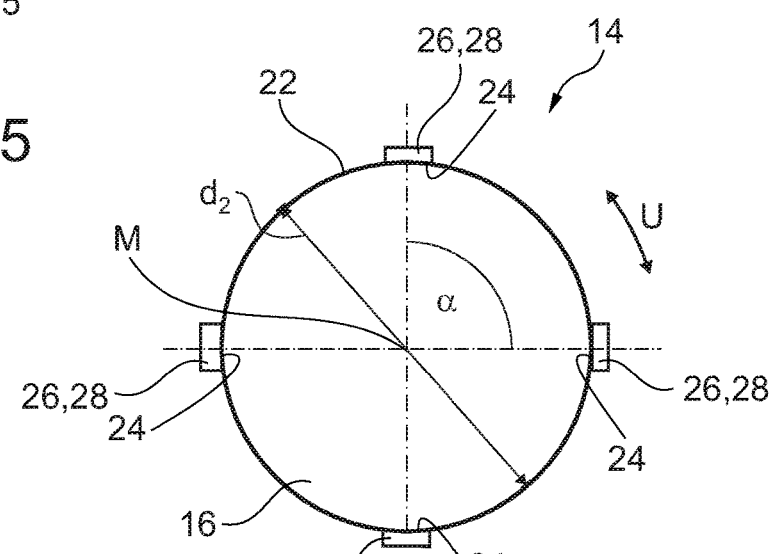
Figure 10:
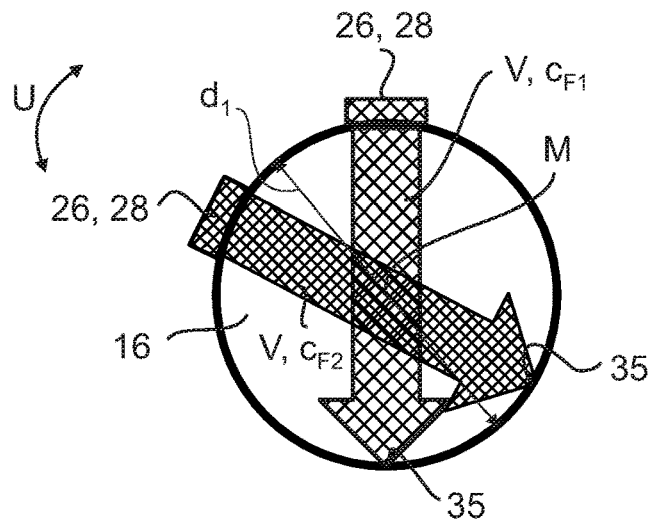
FIGS. 10 and 11 show a course of a measurement section through the flow channel for a second embodiment of the invention.

FIGS. 5, 10 and 11 show a second embodiment which is used especially for measuring tubes 14 having a smaller diameter $d_1$ between, for example, 4 mm and 50 mm, in particular 15 mm and 40 mm.

In this case, only two waveguide parts 24 are provided in total, which are arranged offset from each other at an acute angle, for example about 60° in the circumferential direction U, on the measuring tube 14 (see FIGS. 5 and 10). The normal wall of the measuring tube 14 with the undiminished wall thickness W1 and without signal converter 26, 28, i.e. no waveguide part 24, is located opposite the respective waveguide parts 24.

A first and a second signal converter 26, 28 are arranged on each of the two waveguide parts 24, wherein the distances between the signal converters 26, 28 of a waveguide part 24 are selected differently for both waveguide parts 24. FIG. 11 illustrates this with the lengths $a_S$ and $a_S+a_V$. It is possible to use a sensor assembly 30 described above with the given signal converter distance $a_S$ for one of the two waveguide parts 24 and to arrange the two signal converters 26, 28 with an additional offset av along the axial direction A for the second waveguide part 24 only. Here, the distance between the two signal converters 26, 28 could also be selected smaller than the distance $a_S$ of the two signal converters 26, 28 on the other waveguide part 24.

In this embodiment, in contrast to the embodiment described above, the decoupled bulk wave V for both fluid sound velocities $c_{F1}$, $c_{F2}$ is reflected exactly once at the inner side 35 of the flow channel 16 diametrically opposite the respective waveguide part 24 and thus hits the waveguide part 24 from which it was decoupled again and is detected by the second signal converter 28 on this waveguide part 24.

Otherwise, the measuring procedure is the same as described for the first embodiment.

It is also possible here to reverse the course of the measurement section in that the second signal converter 28 works as a transmitter and the first signal converter 26 of a waveguide part 24 works as a receiver.

The reference signal is here also generated on the respective waveguide part 24, in which the surface wave 44 running from the first signal converter 26 to the second signal converter 28 is detected. All waveguide parts 24 are identically shaped here. In the variants shown here, all waveguide parts 24 are arranged at the same position with respect to the axial direction A.

By evaluating the temporal intensity course, e.g. in case of a time of flight difference measurements between different measurement paths, the desired properties of the fluid are determined in the evaluation unit, which can be formed either in the fluid measuring means 10 or as an external unit. In this way, conclusions can be drawn about properties of the fluid in the flow channel such as the flow velocity, flow rate, concentration, viscosity, sound velocity, temperature and homogeneity.

The invention claimed is:

1. A fluid measuring means having a measuring tube, in which a circumferentially closed flow channel for a fluid to be measured is formed and in which at least two areas of an outer wall of the measuring tube are configured as waveguide parts, which each form a waveguide for surface acoustic waves,
wherein a first and/or a second signal converter is arranged at each waveguide part and the first and/or the second signal converter is designed to excite surface acoustic waves in the respective waveguide part and/or to receive surface acoustic waves from the waveguide part, wherein surface acoustic waves emitted by the first and/or the second signal converter are adapted to be decoupled from the waveguide part and to propagate as bulk acoustic waves through the fluid in the flow channel and/or bulk acoustic waves are adapted to be coupled into the waveguide part and to be received by the first and/or the second signal converter, wherein the waveguide parts are spaced apart from each other along a circumference of the flow channel, and wherein at least two first signal converters arranged on different waveguide parts or two second signal converters arranged on different waveguide parts are spaced with respect to each other in an axial direction of the flow channel,
wherein each of the waveguide parts are located opposite an area of the measuring tube which is not configured as a respective waveguide part and on which no signal converters are provided, wherein a wall thickness of the outer wall of the measuring tube in these areas is unchanged compared to areas of the outer wall adjacent in a circumferential direction, wherein the fluid measuring means is designed such that a decoupled bulk sound wave is reflected back at an area of an inner side to the waveguide part from which it was decoupled.

2. The fluid measuring means according to claim 1, wherein the fluid measuring means is designed such that a measurement section extending through the flow channel between two signal converters having a greater length is provided for fluids having higher sound velocities, and a measurement section extending through the flow channel between two signal converters having a smaller length for fluids having lower sound velocities.

3. The fluid measuring means according to claim 1, wherein the decoupled bulk sound wave is reflected back only once at the area of the inner side to the waveguide part from which it was decoupled.

4. The fluid measuring means according to claim 1, wherein the measuring tube has a diameter which is between 4 and 50 mm.

5. The fluid measuring means according to claim 1, wherein a distance between the first and the second signal converter of a waveguide part is different for at least two waveguide parts.

6. The fluid measuring means according to claim 1, wherein one respective waveguide part or one pair of waveguides defines a shorter measurement section extending through the flow channel and one respective waveguide part or one pair of waveguides defines a longer measurement section extending through the flow channel.

7. The fluid measuring means according to claim 1, wherein all waveguide parts are arranged such that they are each arranged on a parallel to a central axis of the flow channel.

8. The fluid measuring means according to claim 1, wherein the first and/or the second signal converter are arranged such that bulk acoustic waves pass through a central axis of the flow channel directly after being decoupled from the respective waveguide part of each of the first and/or the second signal converter acting as a transmitter.

9. The fluid measuring means according to claim 1, wherein the waveguide parts both form part of the inner side of the flow channel which comes into direct contact with the fluid flowing through and are configured as flattenings on the outer wall of the measuring tube, in which the wall thickness of the measuring tube is reduced.

10. The fluid measuring means according to claim 9, wherein, in a side view, the flattenings are each configured in an oblique manner and so as to taper towards axial ends thereof.

11. A fluid measuring means having a measuring tube, in which a circumferentially closed flow channel for a fluid to be measured is formed and in which at least two areas of an outer wall of the measuring tube are configured as waveguide parts, which each form a waveguide for surface acoustic waves,
wherein a first and/or a second signal converter is arranged at each waveguide part and the first and/or the second signal converter is designed to excite surface acoustic waves in the respective waveguide part and/or to receive surface acoustic waves from the waveguide part, wherein surface acoustic waves emitted by the first and/or the second signal converter are adapted to be decoupled from the waveguide part and to propagate as bulk acoustic waves through the fluid in the flow channel and/or bulk acoustic waves are adapted to be coupled into the waveguide part and to be received by the first and/or the second signal converter, wherein the waveguide parts are spaced apart from each other along a circumference of the flow channel, and wherein at least two first signal converters arranged on different waveguide parts or two second signal converters arranged on different waveguide parts are spaced with respect to each other in an axial direction of the flow channel,
wherein an even number of waveguide parts is provided, wherein two waveguide parts are respectively arranged diametrically opposite one another and form a pair of waveguides, wherein at least two pairs of waveguides are provided and each pair of waveguides has a waveguide part serving as a reference waveguide and a waveguide part serving as a measuring waveguide, wherein an axial position of the first and/or the second signal converter on the measuring waveguide differs in the at least two pairs of waveguides.

12. The fluid measuring means according to claim 11, wherein the measuring tube has a diameter which is between 10 and 400 mm.

13. The fluid measuring means according to claim 11, wherein a length of a measurement section extending through the flow channel between the first and the second signal converters of diametrically opposite waveguide parts is different for two pairs of waveguides.

14. The fluid measuring means according to claim 11, wherein in different pairs of the at least two pairs of waveguides, the first or the second signal converters are located at different axial positions.

15. The fluid measuring means according to claim 14, wherein a respective measurement section is formed between the first signal converter of the reference waveguide and the signal converter on an associated measuring waveguide of the pair of waveguides.

16. The fluid measuring means according to claim 15, wherein the decoupled bulk acoustic waves are not reflected at an inner side of the flow channel before they couple into the measuring waveguide.

17. The fluid measuring means according to claim 11, wherein a distance between the first and the second signal converter is equal on one respective waveguide part of two different pairs of the at least two pairs of waveguides.

18. The fluid measuring means according to claim 11, wherein the fluid measuring means is designed such that a measurement section extending through the flow channel between two signal converters having a greater length is provided for fluids having higher sound velocities, and a measurement section extending through the flow channel between two signal converters having a smaller length for fluids having lower sound velocities.

* * * * *